United States Patent
Bottome

(10) Patent No.: US 8,840,361 B2
(45) Date of Patent: Sep. 23, 2014

(54) FAN BLADE WITH WINGLET

(75) Inventor: Kristofer J. Bottome, Nottingham (GB)

(73) Assignee: Rolls-Royce PLC, London (GB)

( * ) Notice: Subject to any disclaimer, the term of this patent is extended or adjusted under 35 U.S.C. 154(b) by 529 days.

(21) Appl. No.: 13/225,035

(22) Filed: Sep. 2, 2011

(65) Prior Publication Data

US 2012/0063909 A1 Mar. 15, 2012

(30) Foreign Application Priority Data

Sep. 9, 2010 (GB) .................................. 1015006.8

(51) Int. Cl.
*F01D 5/14* (2006.01)

(52) U.S. Cl.
CPC .............. *F01D 5/14* (2013.01); *F05D 2240/30* (2013.01); *F05D 2220/36* (2013.01); *F05D 2260/96* (2013.01); *F05D 2300/603* (2013.01); *Y02T 50/673* (2013.01); *Y02T 50/672* (2013.01); *Y10S 415/904* (2013.01); *Y10S 416/50* (2013.01)
USPC .................... 415/9; 415/119; 415/904; 416/2; 416/62; 416/189; 416/241 A; 416/500

(58) Field of Classification Search
USPC ............ 415/9, 119, 914; 416/2, 62, 179, 189, 416/190, 191, 230, 241 R, 241 A, 500
See application file for complete search history.

(56) References Cited

U.S. PATENT DOCUMENTS

| | | | | |
|---|---|---|---|---|
| 7,252,478 B2 * | 8/2007 | Aynsley | .................... | 416/204 R |
| 7,632,062 B2 * | 12/2009 | Harvey et al. | ................. | 415/115 |
| 7,641,446 B2 * | 1/2010 | Harvey | ......................... | 416/235 |
| 8,133,032 B2 * | 3/2012 | Tibbott et al. | ................. | 416/235 |
| 2006/0059887 A1 | 3/2006 | Klingels et al. | | |
| 2010/0054955 A1 * | 3/2010 | Helvaci et al. | ............... | 416/97 R |

FOREIGN PATENT DOCUMENTS

| | | |
|---|---|---|
| EP | 2 148 042 A2 | 1/2010 |
| EP | 2 161 412 A2 | 3/2010 |
| GB | 710938 | 6/1954 |
| GB | 733918 | 7/1955 |
| GB | 946794 | 1/1964 |

OTHER PUBLICATIONS

British Search Report issued in British Application No. 1015006.8 dated Dec. 17, 2010.

* cited by examiner

*Primary Examiner* — Igor Kershteyn
(74) *Attorney, Agent, or Firm* — Oliff PLC

(57) ABSTRACT

A fan blade (10) for a turbofan aero engine comprises a blade body including a root (10c) for engagement with a rotor, and a tip, wherein the tip is provided with a winglet (14).

15 Claims, 5 Drawing Sheets

FAN BLADE WITH WINGLET

TECHNICAL FIELD

The present invention relates to a fan blade for an aero engine, and is concerned particularly with a fan blade having a winglet.

BACKGROUND

In a ducted fan, such as is commonly used in an aero engine for example, a fan is disposed coaxially within a duct and is driven to rotate within the duct to direct air rearwardly through the duct.

For efficiency and stability of the fan blades, the gaps between the tips of the blades and the inner casing of the duct, within which the fan rotates, must be kept to a minimum so as to minimise the leakage of air around the tips of the blades.

For a conventional fan blade, in order to eliminate damage to the blade and ultimately maximise its longevity, there would be a sizeable clearance gap between the blade tip and the fan case, to ensure that even under heavy manoeuvre loading there would be no contact with the inner surface of the fan case. However, an increased clearance gives a large specific fuel consumption penalty due to aerodynamic losses at the tip of the fan blade. Tip leakage is caused by the working fluid (i.e. air) tending to migrate from the concave or "pressure" surface to the convex or "suction" surface of the aerofoil through the gap between the tip of the blade and the stationary casing. The leakage occurs because of a pressure differential, and leakage causes flow disturbances over a large proportion of the aerofoil surface. These flow disturbances across the blade surface also cause a reduction in efficiency of the blade which results in a reduction of performance of the fan system.

Such flow disturbances also contribute to noise, and increasingly noise legislation places severe constraints upon engine design, with a key component of engine noise being that generated by the fan itself.

For previously considered fan systems, a so called "tip rubbing" solution is used in which the duct casing is provided with a lining comprising a sacrificial abradable layer which in certain operating conditions is designed to be cut or rubbed away by the blade tips as the fan blade passes the surface of the fan casing. The liner is sometimes referred to as a fan track liner (FTL). This approach helps to minimise the gap between the static casing and the rotating blade, thereby reducing tip leakage. However, this approach can only provide optimal sealing at maximum speed, when the blades are at maximum elongation, and not at cruise speeds where in a long haul flight the engine will spend most of its time and use most of its fuel.

For aerofoils such as wings, it is known that winglets improve the aerodynamic performance of the wing and hence of the aircraft. A winglet is typically a relatively small wing surface disposed on the tip of the main wing at right angles to the spanwise direction of the wing. The use of winglets at the tip of the wing reduces wing vortices and also noise, and lengthens the effective wing.

Previously considered winglet systems include those employed in turbine blades. Adaptation of such winglet designs for use with fan blades would require major changes to the fan architecture. More mass would be located at the tip of the fan blade, again requiring considerable redesign of the blade itself. Although turbine systems do rotate at similar rotational speeds to fans they are much smaller and much lighter. The forces on a similar system for a fan blade would be very large due to the extra mass and much greater radius of the fan blade as compared with a turbine blade. For a fan blade of composite material these problems would occur to a greater degree than with conventional metallic blades. The addition of further components to the blade would also affect stress concentrations and lead to potential initiation sites for damage and delamination within the composite fan blade.

Winglet systems have also be previously considered for cooling fans. However, these are low speed, low mass systems usually of plastic material and typically with a large clearance between the fan and its casing. An injection moulded plastic fan would be impractical and unworkable for a large turbofan engine since such blades have low strength, low integrity, low fatigue life and poor impact resistance. They also suffer unduly from "creep"—i.e. elongation under centrifugal forces.

Previously considered winglet systems, if used in fan systems, would also likely be uncontained by current so called "containment systems". These are typically structures which are employed in the fan casing to contain fragments of detached fan which may, in very exceptional circumstances, be released for example when a fan blade is struck by an object, such as a bird, leading to a so called fan blade off (FBO) event. The width of the tip, increased by the presence of a winglet, would reduce the pressure energy of the fan blade fragment significantly, which could then prevent the fan blade fragment from penetrating the liner of the casing, which is necessary for it to be retained and contained by the fan case.

SUMMARY

The present invention has been devised with the foregoing in mind, and embodiments of the invention aim to address at least some of the aforementioned problems.

The present invention is defined in the attached independent claims to which reference should now be made. Further, preferred features may be found in the subclaims appended thereto.

According to the invention there is provided a fan blade for a turbofan aero engine, the fan blade comprising a blade body including a root for engagement with a rotor, and a tip, wherein the tip is provided with a winglet.

The winglet may extend transversely with respect to the span-wise direction of the blade body.

The winglet preferably extends towards a suction side of the blade body in use.

Alternatively or additionally the winglet may extend towards a pressure side of the blade body in use.

The winglet may be substantially planar or may be curved.

In a preferred arrangement the winglet is frangible.

The winglet may be arranged to become detached from the blade body upon collision with a casing liner of an aero engine.

The winglet may be shaped so as to initiate disintegration of the blade body upon collision with a casing liner of an aero engine.

The winglet may be integrally formed with the fan blade body.

Alternatively the winglet may be attached to the fan blade body by attachment means.

The fan blade body and winglet may both be of composite material.

The fan blade body and winglet may both be of metal.

One of the fan blade body and winglet may be of composite material and the other of the fan blade body and winglet may be of metal.

The invention also includes a turbofan aero engine comprising a fan blade according to any statement herein.

The invention may include any combination of the features and limitations referred to herein, except combinations of such features as are mutually exclusive.

Preferred embodiments of the present invention will now be described by way of example only with reference to the accompanying diagrammatic drawings in which:

DETAILED DESCRIPTION

Figure 1:
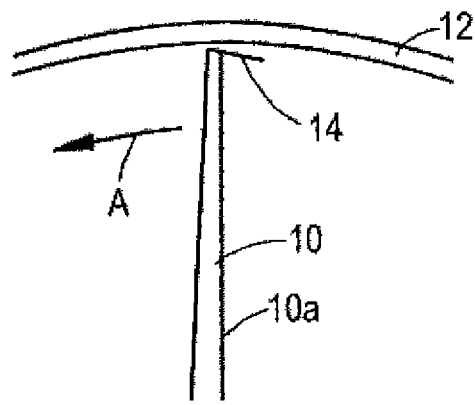
FIG. 1 shows schematically a fan blade rotating within a fan case of an aero engine, in accordance with an embodiment of the present invention.

Turning to FIG. 1, this shows generally at 10 a fan blade, which can be of a composite material such as a fibre-reinforced material, or else can be of metal alloy, such as titanium alloy. The fan blade is attached at its root to a rotor (not shown) of the fan and rotates in the direction of arrow A within the fan case 12 of an aero engine. At the tip of the blade 10 is a winglet 14 extending towards the suction side 10a of the blade 10. This gives the benefit of improved blade performance, potentially higher aerodynamic efficiency, lower tip pressure losses and improvements in fan noise. The winglet can be combined with a metallic tip protection feature (not shown) in order to allow a composite fan blade to rub against an abradable fan track liner. A sharp metallic cutting edge can be incorporated into the winglet to assist in the abrading of the abradable liner.

The winglet could be applied to either a metallic or a composite fan blade. In the case of a composite fan blade the winglet could be manufactured integrally as part of the layup of the blade. Alternatively, if the blade is of a metallic material the winglet can be incorporated as part of the forming and assembly process of the blade.

If the winglet is not manufactured integrally with the blade, it can be bonded, welded, brazed to the blade or mechanically attached by rivets, bolts, screws or other such fixings including a combination of these. These methods other than brazing or welding would allow the winglet to be of a different material to the blade and this could then allow the winglet to be optimised for low mass, high stiffness, abradability and/or strength.

Figure 2:
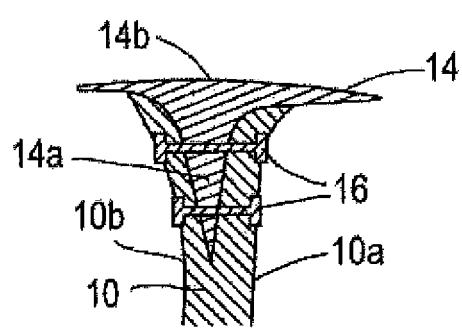
FIG. 2 shows schematically a method of attaching a winglet to a fan blade.

FIG. 2 shows schematically one method of attaching the winglet 14 to the blade 10. In this example the winglet 14 has a generally T-shaped cross section including a root 14a which is inserted into a correspondingly shaped groove in the blade tip, and a wing portion 14b which extends towards both the pressure side 10b and suction side 10a of the blade 10. The winglet is attached by a pair of rivets 16 to the blade 10. If a tip-rubbing solution is required then the winglet tip can be used to provide protection to the composite blade, thereby minimising the tip clearance to improve performance, whilst improving the efficiency of the blade system.

Figure 3:
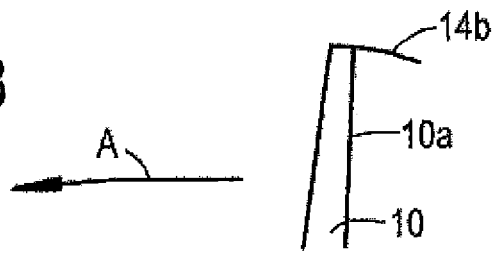
FIG. 3 shows schematically an alternative embodiment of fan blade and winglet, in accordance with the invention.
Figure 4:
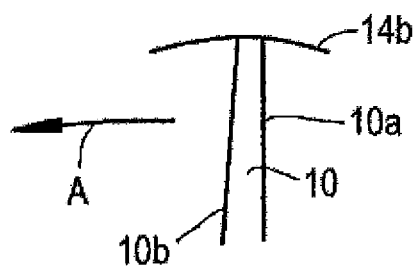
FIG. 4 shows schematically a further alternative embodiment of fan blade and winglet in accordance with the invention.

FIGS. 3 and 4 shows schematically alternative designs of winglet, in which the wing portion 14b of the winglet 14 is curved. In FIG. 3, the winglet 14 extends only towards the suction side 10a of the blade 10, whereas in FIG. 4 the winglet 14 extends towards both the pressure 10a and suction 10b sides of the blade 10.

Figure 5:
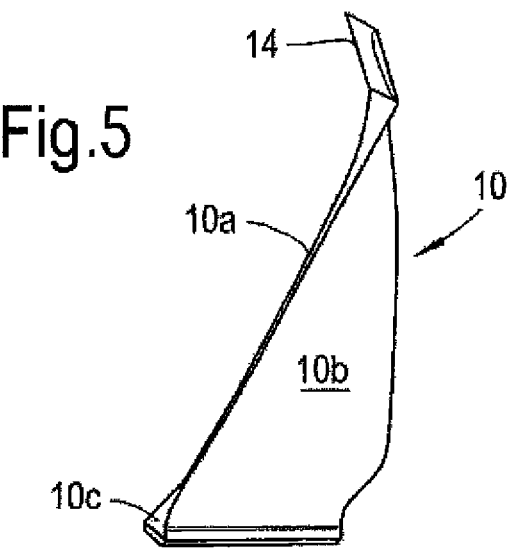
FIG. 5 is a perspective view of the fan blade and winglet of FIG. 1.

FIG. 5 shows the preferred arrangement of the blade 10 of FIG. 1, in perspective view. The blade 10 has pressure 10b and suction 10a faces and a root 10c for locating in a rotor (not shown) of a fan. The winglet 14 extends towards the suction side 10a of the blade 10.

The winglet edge can either be smooth and perpendicular to the flow, or else can be concave or convex, smooth, serrated or saw-tooth in profile. These alternatives in the winglet trailing edge can change the boundary layer flow over the trailing edge and the surface of the blade, potentially allowing the profile of the flow to be optimised over the blade. The change in boundary layer flow could also effect a reduction in the noise generated by the system and also improve the efficiency of the system.

Figure 6A:
FIGS. 6a and 6b show details of alternative designs of winglet trailing edge according to embodiments of the invention.
Figure 6B:

FIGS. 6a and 6b depict respectively smooth profile and serrated profile trailing edges of the winglet 14.

The winglet acts as a barrier to stop tip leakage across the gap between the tip of the blade and the static casing, shroud or liner surrounding it. The pressure drop across the tip is spread across a greater distance and slows the forcing effect of the leakage. It also reduces the formation of tip vortices which are a major cause of the noise generated by the fan blade in use. Existing case treatments to reduce tip leakage and turbulence, such as pump grooves, are still applicable and may be used with the embodiments described herein.

In order to allow the blade to penetrate the casing in an FBO event, the winglet can be made to be frangible. A metallic blade could have a composite winglet that is stiff but brittle, and would break off as an FBO impact begins to occur. The winglet would be designed to impact the fan case first and to break off to allow the main body of the blade fragment to penetrate the fan track liner. A plane of weakness or a stress concentration can be incorporated into the design; this may be particularly useful for metallic blades with metallic winglets.

Figure 7A:
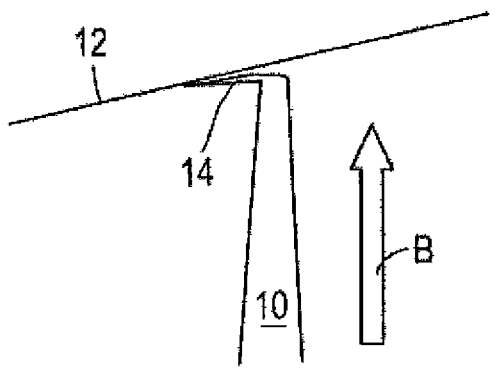
FIGS. 7a-7c represent schematically a sequence of steps in a fan blade off (FBO) event.
Figure 7B:
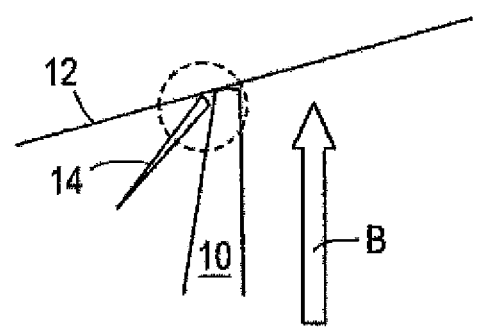
Figure 7C:
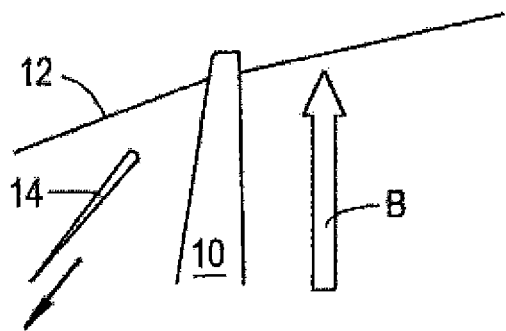

FIGS. 7a-7c depict a sequence of steps in an FBO event. Blade motion is radially outwards in the direction of arrow B. The winglet (14) impacts the fan case (12) first (see FIG. 7a), then the force of the fan case exerted on the winglet causes it to bend and fail by brittle fracture (if it is of a composite material) or bend and break through a plane of weakness or a stress concentration (if metallic) (see FIG. 7b). Now the blade tip is of a lower area, so the pressure energy available is much higher and the blade will be able to penetrate the liner (see FIG. 7c).

The inherent properties of composite components could be exploited to facilitate the desired break-up behaviour. For example, if a composite winglet is combined with a composite blade, then when the winglet hits the casing it is essentially an impact in the out-of-plane direction, which is generally a direction in which composite materials are relatively weak. When the blade hits the casing, by contrast, it is essentially an impact in an in-plane direction, in which composite materials are relatively strong. The tendency will therefore be for the winglet to break, but for the blade to remain intact so that it can penetrate the liner.

Alternatively, for a composite blade, the winglet and the winglet attachment, such as the root 14a of the winglet, can be made to enhance the process of break-up of the blade itself. The shape of the root 14a is such that upon impact the root is driven into the end of the blade thereby creating a delamination crack which propagates along the blade length and assists in the crushing and shedding of the local composite material.

If a frangible winglet is not used, then for a composite blade, rather than retain the blade it is desirable to break it into small, low-energy debris. The winglet can act as an initiator of this process in order to achieve break-up of the blade into the smallest possible fragments. This allows a hard wall containing system to be used as the fan track liner. In such a system, no part of the fan blade will penetrate the fan track liner, but the whole blade is contained within it. In order that the blade fragments do not cause damage to components downstream, it is generally necessary to ensure these fragments are as small as possible.

Figure 8A:
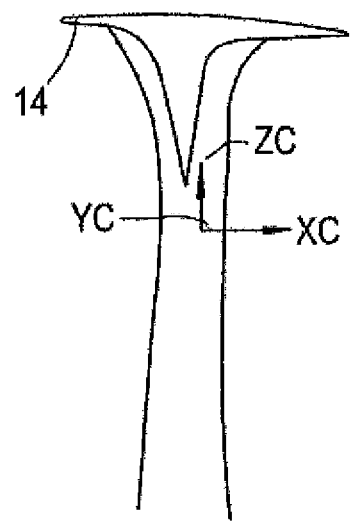
FIGS. 8a-8c represent schematically a sequence of steps of a fan blade off (FBO) event according to an alternative embodiment of blade and winglet.

For a composite blade with metal components the carbon components must be broken into the smallest possible fragments and the metallic components must be retained or contained by the containment system. The fan blade tip incorporating the winglet can be used as a damage initiator (see FIG. 8a).

Figure 8B:
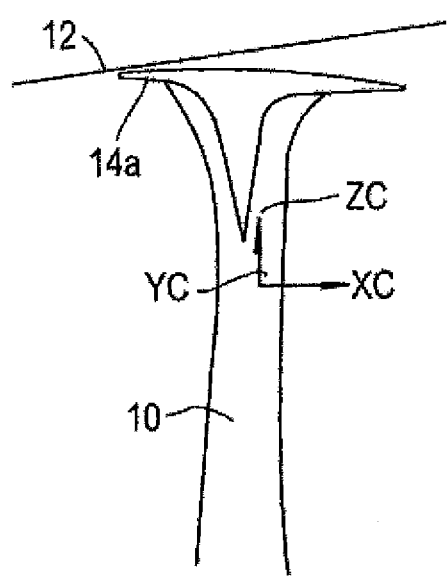

Upon impact with the case (see FIG. 8b) the metallic tip 14a of the winglet bends and deflects the blade plus any extra metalwork. Force acting along the radial axis pushes the tip into the composite blade causing it to break up, and inducing crushing of its composite structure.

Figure 8C:
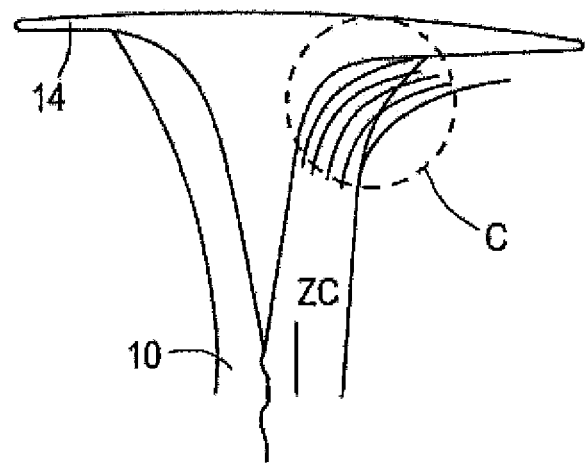

Referring to FIG. 8c, the shaped metallic tip of the winglet forces the majority of the composite material at the tip of the blade to splay out, causing further break-up of the blade and further movement of the broken material in the region shown in circle C.

Figure 9:
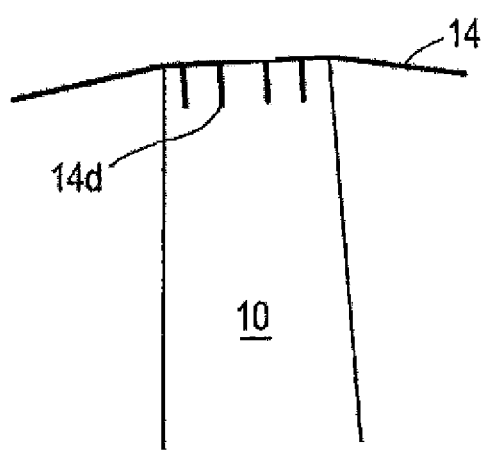
FIG. 9 shows schematically a section through a blade tip according to a still further embodiment of the present invention.

The initiator can have multiple, vertical elements 14d in order to delaminate the blade at multiple sites, yet provide more resistance to axial impact whilst allowing radial impact to cause delamination, as is shown in FIG. 9.

The casing and winglet surface features can be utilised to reduce turbulence, reduce leakage and also to provide pumping features.

The blade structures incorporating winglets as described above provide a number of advantages as compared with previously considered blades.

For example, it is known that winglets improve the effective efficiency of an aerofoil by acting as a barrier to reduce tip leakage. The known advantages of winglets can be used in the context of a turbofan blade to improve specific fuel consumption and fuel burn, and reduce fan system noise.

Furthermore, avoiding the necessity for a tip-rubbing solution can offer reduced damage to composite or hybrid blade tips during abnormal operating conditions which leads to fewer repairs and fewer replacement blades and therefore amounts to lower engine operating costs.

If the winglet is co-moulded or laid up as part of the manufacture of the composite blade it can reduce requirements for further fittings and fixtures and therefore assist in the goal of reducing the weight of the system.

A winglet system as described above can allow clearances to be built into the components at the manufacturing stage which provides for easier assembly. The currently used fan track liners need to be machined once they are actually on the engine in order to ensure a good fit with the blade system. The requirement for this is removed if a greater clearance can be allowed.

Installing with a greater clearance also provides for an easier fitment of the fan blades themselves.

A frangible winglet system allows the blades to be retained using existing fan case features and containment structures. The embodiments described above are compatible with a hardwall containment system.

Finally, winglets can be used to provide the blade tip with greater beam strength, which is helpful in resisting the impacts of large birds.

The invention claimed is:

1. A fan blade for a turbofan aero engine, the fan blade comprising a blade body including a root for engagement with a rotor, and a tip, wherein the tip is provided with a winglet, wherein the winglet is frangible.

2. A fan blade according to claim 1 wherein the winglet extends transversely with respect to the span-wise direction of the blade body.

3. A fan blade according to claim 1 wherein the winglet extends towards a suction side of the blade body in use.

4. A fan blade according to claim 1 wherein the winglet extends towards a pressure side of the blade body in use.

5. A fan blade according to claim 1 wherein the winglet extends towards both suction and pressure sides of the blade body in use.

6. A fan blade according to claim 1 wherein the winglet is substantially planar.

7. A fan blade according to claim 1 wherein the winglet is curved.

8. A fan blade according to claim 1 wherein the winglet is arranged to become detached from the blade body upon collision with a casing liner of an aero engine.

9. A fan blade according to claim 1 wherein the winglet is shaped so as to initiate disintegration of the blade body upon collision with a casing liner of an aero engine.

10. A fan blade according to claim 1 wherein the winglet is integrally formed with the fan blade body.

11. A fan blade according to claim 1 wherein the winglet is attached to the fan blade body by attachment means.

12. A fan blade according to claim 1 wherein the fan blade body and winglet are both of composite material.

13. A fan blade according to claim 1 wherein the fan blade body and winglet are both of metal.

14. A fan blade according to claim 1 wherein one of the fan blade body and winglet is of composite material and the other of the fan blade body and winglet is of metal.

15. A turbofan aero engine comprising a fan blade according to claim 1.

* * * * *